US011392828B2

(12) United States Patent
Velasco et al.

(10) Patent No.: US 11,392,828 B2
(45) Date of Patent: Jul. 19, 2022

(54) CASE OBJECT CONTEXT EMBEDDINGS FOR MACHINE LEARNING TRAINING OF CASE CONTEXT

(71) Applicant: salesforce.com, inc., San Francisco, CA (US)

(72) Inventors: Edgar Gerardo Velasco, San Francisco, CA (US); Jayesh Govindarajan, Palo Alto, CA (US); Zachary Alexander, Snoqualmie, WA (US); Na Cheng, San Francisco, CA (US); Anuprit Kale, Oakland, CA (US); Peter White, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 969 days.

(21) Appl. No.: 16/140,188

(22) Filed: Sep. 24, 2018

(65) Prior Publication Data

US 2020/0097809 A1     Mar. 26, 2020

(51) Int. Cl.
   *G06N 20/00*    (2019.01)
   *G06N 3/08*     (2006.01)
   *G06F 16/33*    (2019.01)
   *G06F 16/332*   (2019.01)
   *G06N 5/04*     (2006.01)
   *G06F 40/289*   (2020.01)

(52) U.S. Cl.
   CPC .......... *G06N 3/08* (2013.01); *G06F 16/3329* (2019.01); *G06F 16/3347* (2019.01); *G06F 40/289* (2020.01); *G06N 5/04* (2013.01); *G06N 20/00* (2019.01)

(58) Field of Classification Search
   None
   See application file for complete search history.

(56) References Cited

U.S. PATENT DOCUMENTS

| 7,730,478 B2 | 6/2010 | Weissman |
| 7,779,039 B2 | 8/2010 | Weissman et al. |
| 2016/0232543 A1 | 8/2016 | Govindarajan et al. |
| 2017/0286978 A1 | 10/2017 | Govindarajan et al. |

(Continued)

OTHER PUBLICATIONS

Roussinov, Dmitri; J Leon Zhao., Text clustering and summary techniques for CRM message management Journal of Enterprise Information Management, 2004, 17.6: 424-429. Emerald Group Publishing Limited (Year: 2004).*

(Continued)

*Primary Examiner* — David R Vincent
(74) *Attorney, Agent, or Firm* — Haynes and Boone, LLP

(57) ABSTRACT

A system is provided for a machine learning engine using clustered case objects in a case management system. The system includes a multi-layer neural network. The system is configured to receive case object data comprising a case object and contextual objects in the case management system associated with the case object, the contextual objects comprising word vectors, generate a context embedding for the case object using the word vectors for the contextual objects, and cluster the case object with other case objects in the case management system based on the context embedding for the case object and other context embeddings for the other case objects.

24 Claims, 8 Drawing Sheets

(56) References Cited

U.S. PATENT DOCUMENTS

| | | |
|---|---|---|
| 2017/0351401 A1 | 12/2017 | Pascale et al. |
| 2017/0351781 A1 | 12/2017 | Alexander et al. |
| 2018/0089585 A1 | 3/2018 | Rickard et al. |
| 2018/0096250 A1 | 4/2018 | Rickard et al. |
| 2018/0096372 A1 | 4/2018 | Rickard et al. |
| 2018/0101527 A1 | 4/2018 | Govindarajan et al. |
| 2018/0101534 A1 | 4/2018 | Alexander et al. |
| 2018/0101536 A1 | 4/2018 | Govindarajan et al. |
| 2018/0101537 A1 | 4/2018 | Govindarajan et al. |
| 2018/0101617 A1 | 4/2018 | Govindarajan et al. |
| 2018/0239924 A1 | 8/2018 | Rickard et al. |
| 2018/0268025 A1* | 9/2018 | Bandyopadhyay ... G06F 16/284 |
| 2018/0293241 A1 | 10/2018 | Chittar et al. |
| 2019/0005089 A1 | 1/2019 | Kemf et al. |
| 2019/0266070 A1* | 8/2019 | Bhandarkar ........ G06F 11/3644 |
| 2020/0042649 A1* | 2/2020 | Bakis .................... G06F 40/14 |

OTHER PUBLICATIONS

Bradbury et al., "Quasi-Recurrent Neural Networks," Cornell University Library, Under review as a conference paper at ICLR2017, submitted Nov. 21, 2016, arXiv:1611.01576v2, pp. 1-11.

Han et al., "Deep Pyramidal Residual Networks," arXiv preprint arXiv:1610.02915, Sep. 6, 2016, pp. 1-9.

He et al., "Deep Residual Learning for Image Recognition," Proceedings of the IEEE Conference on Computer Vision and Pattern Recognition, 2016, pp. 1-8.

Hu et al., "Squeeze-and-Excitation Networks," arXiv preprint arXiv:1709.01507, Sep. 5, 2017, pp. 1-11.

Iandola et al., "DenseNet: Implementing Efficient ConvNet Descriptor Pyramids," Technical Report, University of California, Berkeley, arXiv preprint arXiv:1404.1869, Apr. 7, 2014, pp. 1-11.

* cited by examiner

Training Data 700

| Case Text 720 | Case Comment 730 | Label 740 |
|---|---|---|
| What is the default and maximum connection timeout for the login() API method in the Enterprise Connection? ... | ... Regarding your questions: 1. Maximum connection timeout allowed for the login() API? Ans: The max limit is 120 seconds ... | 1 |
| What is the default and maximum connection timeout for the login() API method in the Enterprise Connection? ... | Hi, It has come to my notice at some users have activated topic profiles without proper approvals. Can you please delete these topic profiles for me since I am unable to access these topic profiles myself? | 0 |
| What is the default and maximum connection timeout for the login() API method in the Enterprise Connection? ... | Hi <PII>, I have reattached the spreadsheet and hope this one will work. To keep old workflow data please keep the default classification labels and add in the new ones as extras. | 0 |
| What is the default and maximum connection timeout for the login() API method in the Enterprise Connection? ... | <PII> asked if this is can be completed earlier than 3-5 business days due to the client needing this for reporting to their management. | 0 |

Fig. 7

CASE OBJECT CONTEXT EMBEDDINGS FOR MACHINE LEARNING TRAINING OF CASE CONTEXT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to database systems, and more specifically to a system and method for case object context embeddings that are used to train a machine learning model to predict related cases based on case context.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database system can store data or information. In a customer relationship management (CRM) database, for example, this data or information can include records for help requests and other cases of customer relationship management, which may include a user statement for a case object generated by a customer, as well as additional information related to the case. This data and information in a database system can be stored in the form of electronic records or digital objects. When a user is interested in accessing case data or information stored by database system that is related to a specific test case but the user does not know the other related cases, the user typically submits a search query, which may include a statement or utterance for a queried case utterance, to the database system, for example, using a search bar, voice interface, or similar user interface tool. The database system responds with a query result for one or more electronic records or objects that are potentially relevant to the user's query. However, for a database system with many records/objects, this process of identifying objects related to a search query consumes a large amount of system resources (e.g., hardware resources). Additionally, processing such a query will take a long period of time and cause the user to have a negative experience with the online system. Moreover, the search results can contain not only the information or data of interest to the user, but also many "false" hits. As such, the most relevant information or records may be buried or obscured in the returned search results, which further contributes to the user having a negative experience with the database system.

BRIEF DESCRIPTION OF THE DRAWINGS

FIG. 7 is a simplified diagram illustrating an exemplary context data input for determining a context embedding according to some embodiments.

Figure 1:
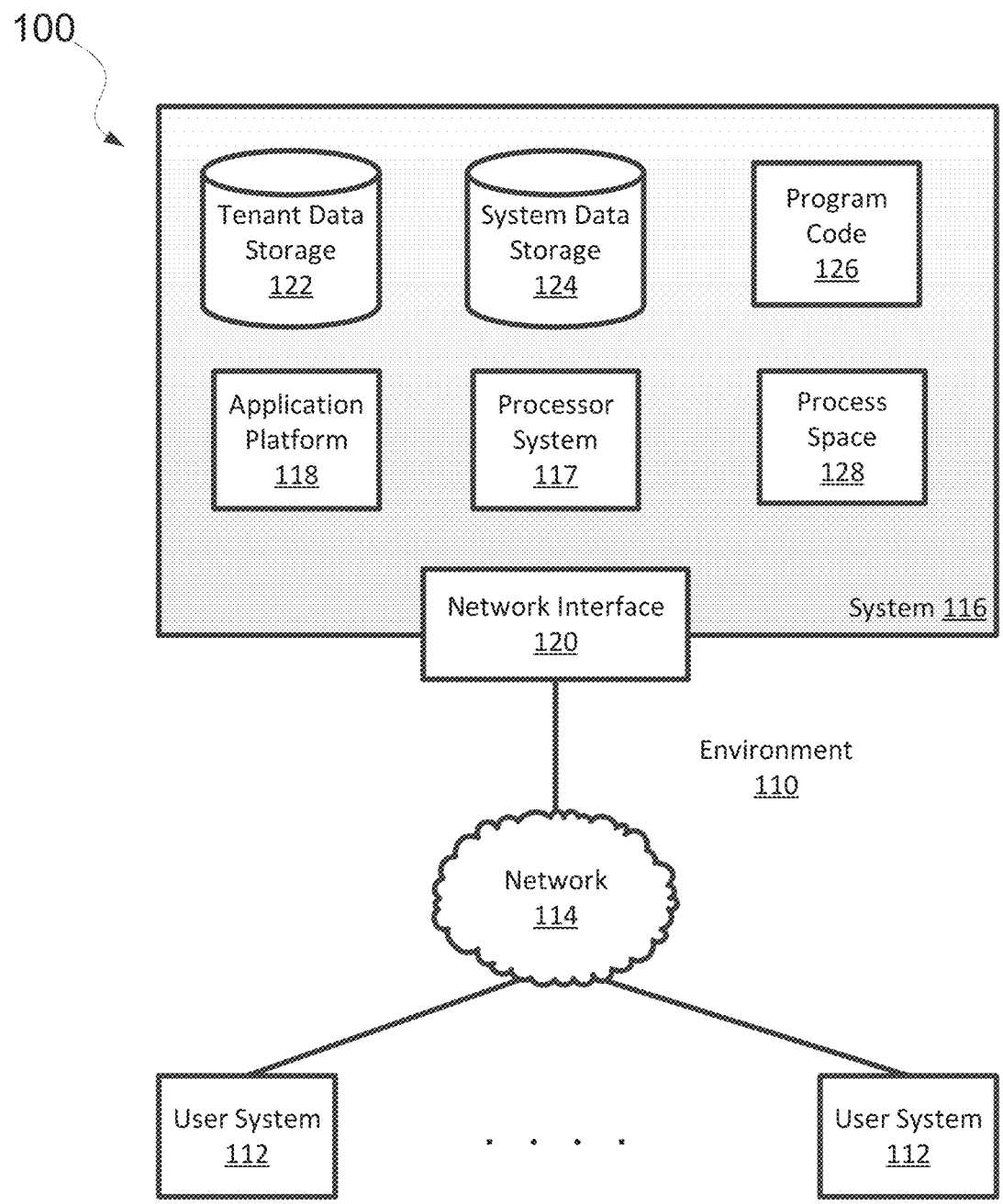
FIG. 1 illustrates a block diagram of an example environment wherein systems and methods for predicting entities for database query results may be used according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a database system accessible by a plurality of separate organizations, such as a multi-tenant database system, methods, data structures, and systems are provided for predicting similar objects based on a case object input into the database system. The database system stores multiple objects that are accessible by users of the database system. The objects may be generated, for example, by users or administrators (e.g., agents of an organization) of the database systems based on customer input and requests to the system, such as a customer's statement for a case (e.g., a help request, which may correspond to some utterance that includes a request statement). At least some objects stored by the database system are associated with particular cases corresponding to the help query or other customer request. The case objects are further associated with contextual objects related to, pointing to, and/or describing a characteristic or related data of the case object, such as the originating statement, a case subject, a case description, a case identifier, a case status, case comments, case status updates, case articles, or agents that handled the case object. Thus, a database system for customer relationship management (CRM) may store case objects associated with customer requests provided to the CRM system and corresponding contextual objects for those case objects based on agents of the system and customers.

The embodiments described herein provide methods, computer program products, and computer database systems for case object context embeddings for predicting related cases in a CRM system using machine learning techniques. An online system provides users with access to online services. For example, the online system may be a web-based CRM system that provides employees of an enterprise with access to CRM software applications. As part of providing the services to users, the online system stores multiple case objects that are accessible by users of the online system. The case objects may be generated, for example, by users or administrators of the online system during interactions with customers.

According to some embodiments, in a multi-tenant database system accessible by a plurality of separate and distinct organizations, a neural network model is provided for predicting related cases in which results are returned that are most relevant for a test case search into the database, taking into account the specificities of each case's context, thereby enhancing the experience of users associated with the organization.

Example Environment

The system and methods of the present disclosure can include, incorporate, or operate in conjunction with or in the environment of a database, which in some embodiments can implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VB Script, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented data base management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
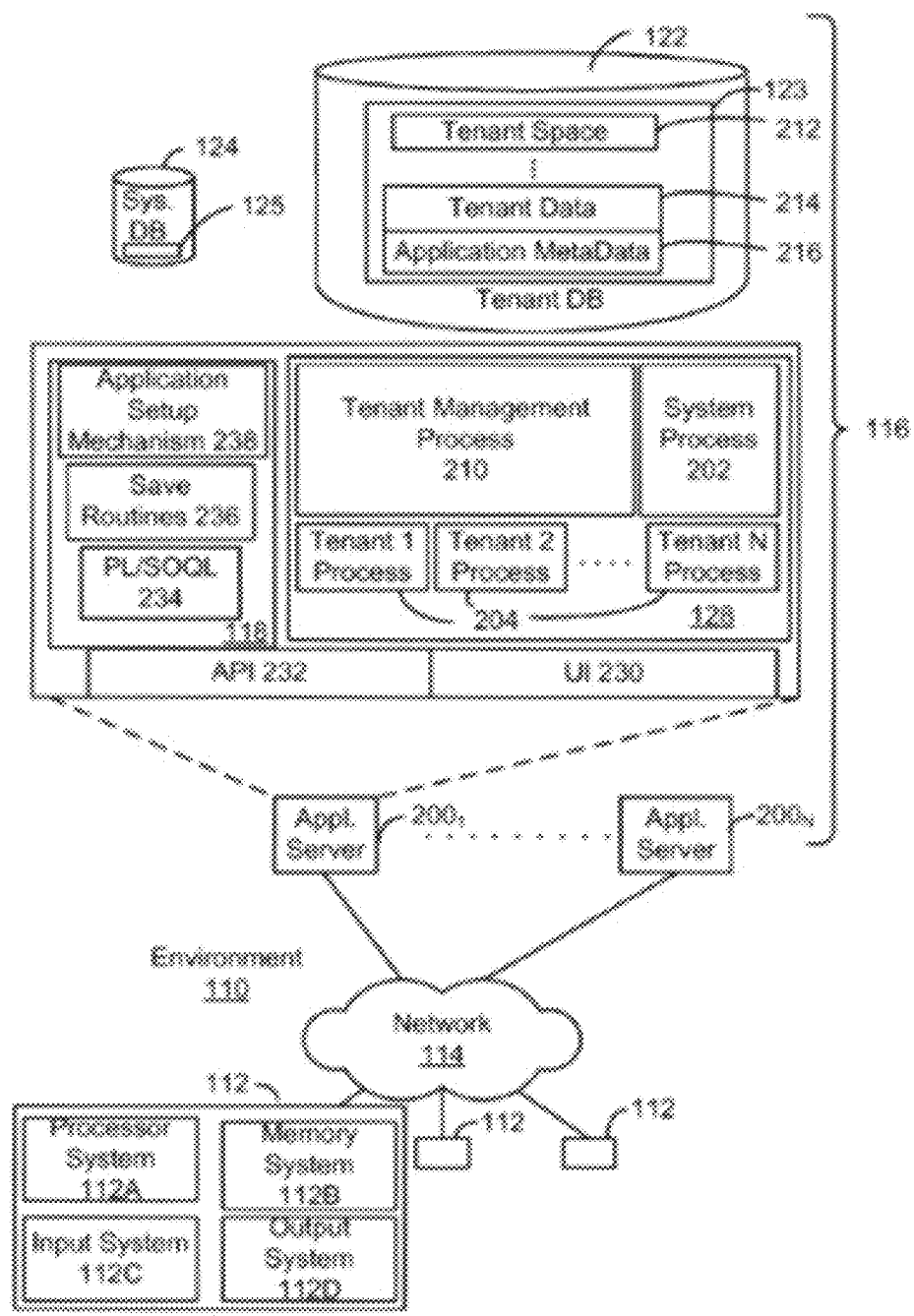
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard case tables for a case submitted to the system and the responses to the case, such as a case statement, case comments, articles, agents handling, etc. For example, a CRM database may include a table that describes a customer help request, and may include the customer utterance for the help request, case comments, and other contextual data pointing to the case object. In some multi-tenant database systems, case tables might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users"), regarding an inquiry, problem, question, issue, support-related matter, etc. To facilitate interaction between the database system 116 and the user, a search bar, voice interface, or similar user interface tool is provided. The search tool allows a user to query the database to access information or data concerning or relating to various objects or entities relevant to the user.

For large databases with many records and information, however, there may be terms (e.g., common text strings like "How do I update from a trial account?") that appear in multiple records over multiple entities. For example, the term, text strings, or other data may appear in some number of records of case objects in a CRM system. Thus, a database system's search index data may not be an accurate basis to predict for which case object a user intends to search when the user submits a test case object. Furthermore, a database system may require a relatively large amount of time and system resources to request and then receive search index data from search servers. It is a difficult task to predict and order case objects searched by the users. In a multi-tenant system, such as Salesforce.com, case objects may also be repeated, for example, if a customer submits multiple help requests. Continuing with the example, because the user may be most interested in one or a small plurality of the case object records, for optimal or enhanced user experience, it may be desirable or preferable that the database system predict the case object(s) that is/are most relevant or applicable to a user's search or query so that the desired information or data is presented to the user in the fewest number of keystrokes or mouse clicks, etc. As such, according to some embodiments, systems and methods are provided for predicting case objects requested by a user based on context embeddings of the case objects.

Neural Model

According to some embodiments, in a multi-tenant database system accessible by a plurality of separate and distinct organizations, such as system 116 shown and described with respect to FIGS. 1 and 2, a neural network model is provided for predicting the case objects in which results are returned that are most relevant for a given test case object into the database, taking into account the context of the case objects, thereby providing for deduplication processes and case object clustering for enhanced user experience.

Figure 3:
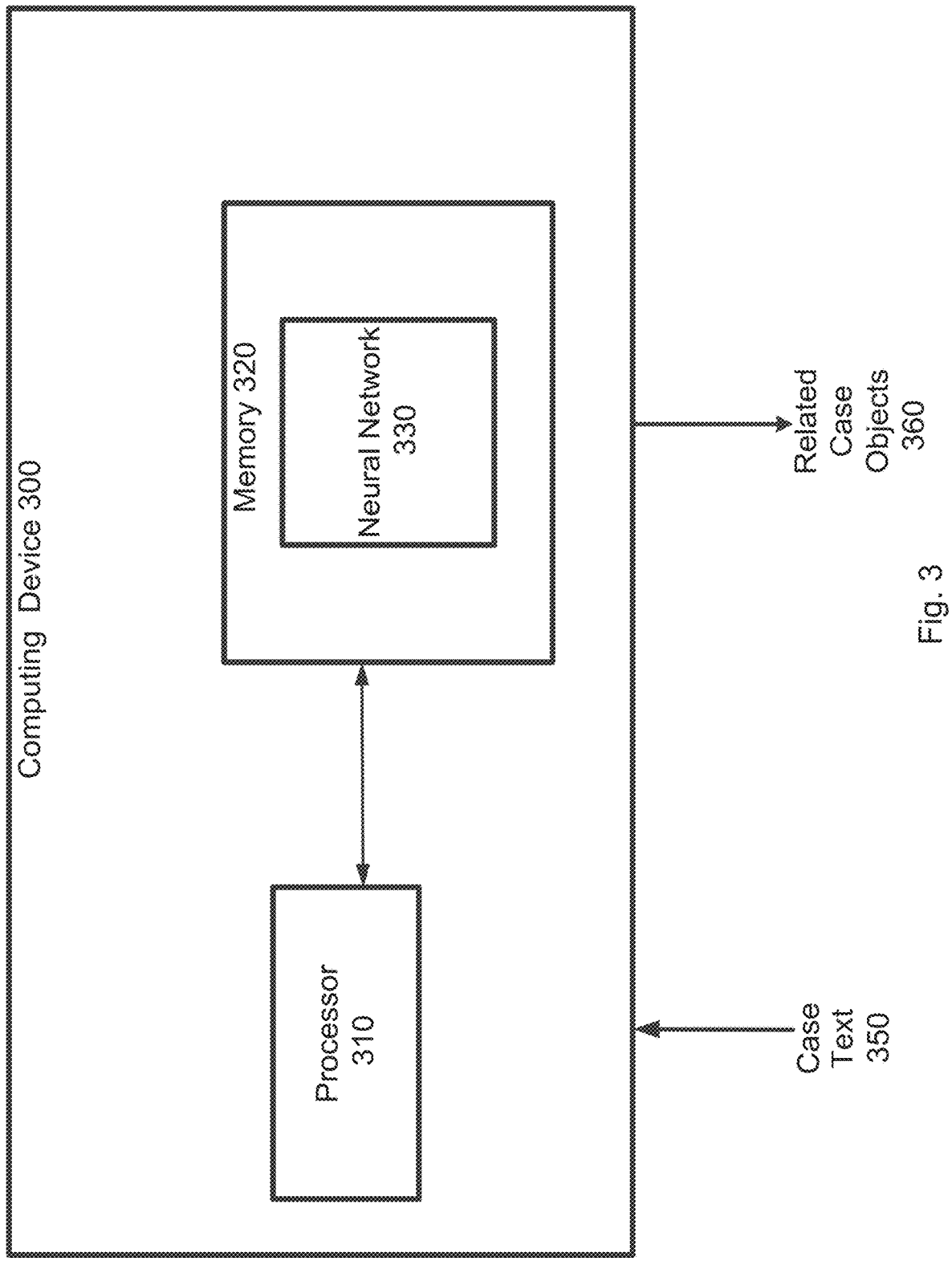
FIG. 3 is a simplified diagram of a computing device according to some embodiments.

FIG. 3 is a simplified diagram of a computing device 300 according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities. In some examples, memory 320 may include non-transitory, tangible, machine readable media that includes executable code that when run by one or more processors (e.g., processor 310) may cause the one or more processors to perform any of the methods described further herein.

As shown, memory 320 includes a neural network 330. Neural networks have demonstrated great promise as a technique for automatically analyzing real-world information with human-like accuracy. In general, neural network models receive input information and make predictions based on the input information. For example, a neural network classifier may predict a class of the input information among a predetermined set of classes. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Neural network models have been shown to outperform and/or have the potential to outperform other computing techniques in a number of applications.

Neural network 330 may be used to implement and/or emulate any of the neural networks described further herein. In some examples, neural network 330 may include a multi-layer or deep neural network. According to some embodiments, the neural network 330 may be trained with one or more encodings or features so that it is able to predict and/or cluster similar case objects in which results are returned that are most relevant for a given search test case into the database system. This is described in more detail below.

After training of the neural network 330, in some embodiments, the neural model implemented by neural network 330 is global for the multi-tenant database system, such as system 116, and applied to or used for all organizations or tenants whose users make queries into the database. Computing device 300 may receive or intake a case text or utterance 350 (e.g., "Please update Trial from PE to EE" or "What is the default and maximum connection timeout for the login( ) API method in the Enterprise Connection?") from a user of an organization or tenant accessing the database system. The case text 350 can be unstructured data in that it can take the form of words, utterances, or a phrase of the user's choosing. In some embodiments, the textual input sequence is not constrained, restricted, or required to be in a particular form or limited to a particular set of words, phrases, or vocabulary. An example of unstructured natural language input according to some embodiments is shown in FIG. 7. As an example, case text 720 of training data shows an utterance or user statement used by a customer when submitting a help query. In some embodiments, the same or similar utterance may be used by an agent to search for similar case objects. The computing device 300 can receive the case text 350 through a user interface.

The computing device 300, using the model of neural network 330, generates related case objects 360 for which results are returned that are most relevant for the case text 350 in the database, taking into account the specificities of the contextual objects associated with case objects in the database. Thus, for example, for an agent (e.g., a user or an administrator of the system) the computing device 300 may predict that similar case objects based on contextual data embeddings that are most relevant for the agent's case text 350, and thus provides or support the provision of search results for, e.g., "What is the default and maximum connection timeout for the login( ) API method in the Enterprise Connection?," from case objects within the CRM system. An example of corresponding contextual objects for case objects in a CRM system is shown in FIG. 7, such as a case comment by a customer or agent. However, additional types of contextual objects may also be returned, such as the agent handling the case object, articles associated with the case object, and the like.

According to some embodiments, the functionality of the computing device 300, including neural network 330, may be implemented or incorporated in a Search Model Service (SMS) plugin. SMS is a gRPC microservice that hosts and executes machine learning models. SMS takes in parameters via a Protobuf file, and executes models using those input parameters. SMS returns a response back to the client (e.g., user device) according to the response parameters defined. In some embodiments, the SMS implementation runs on an environment for containerized applications (e.g., Salesforce Application Model (SAM)) that is separate or independent from the core applications of the multi-tenant database system, such as system 116. SMS may provide for faster deployment of the model. SMS also provides for isolation/containerization of Java virtual machines (JVMs), so that a crash related to its model execution will not impact or affect the application servers of the database system. The SMS plugin is isolated code that can initialize the model data for a particular model type, perform model-specific feature processing, and execute model based on feature vectors and other parameters. The plugin architecture provides various advantages, including that changes can be made to plugin code without making changes to model executor code, and that concerns about load balancing, routing, and parallelizing are reduced or eliminated with plugins.

Figure 4:
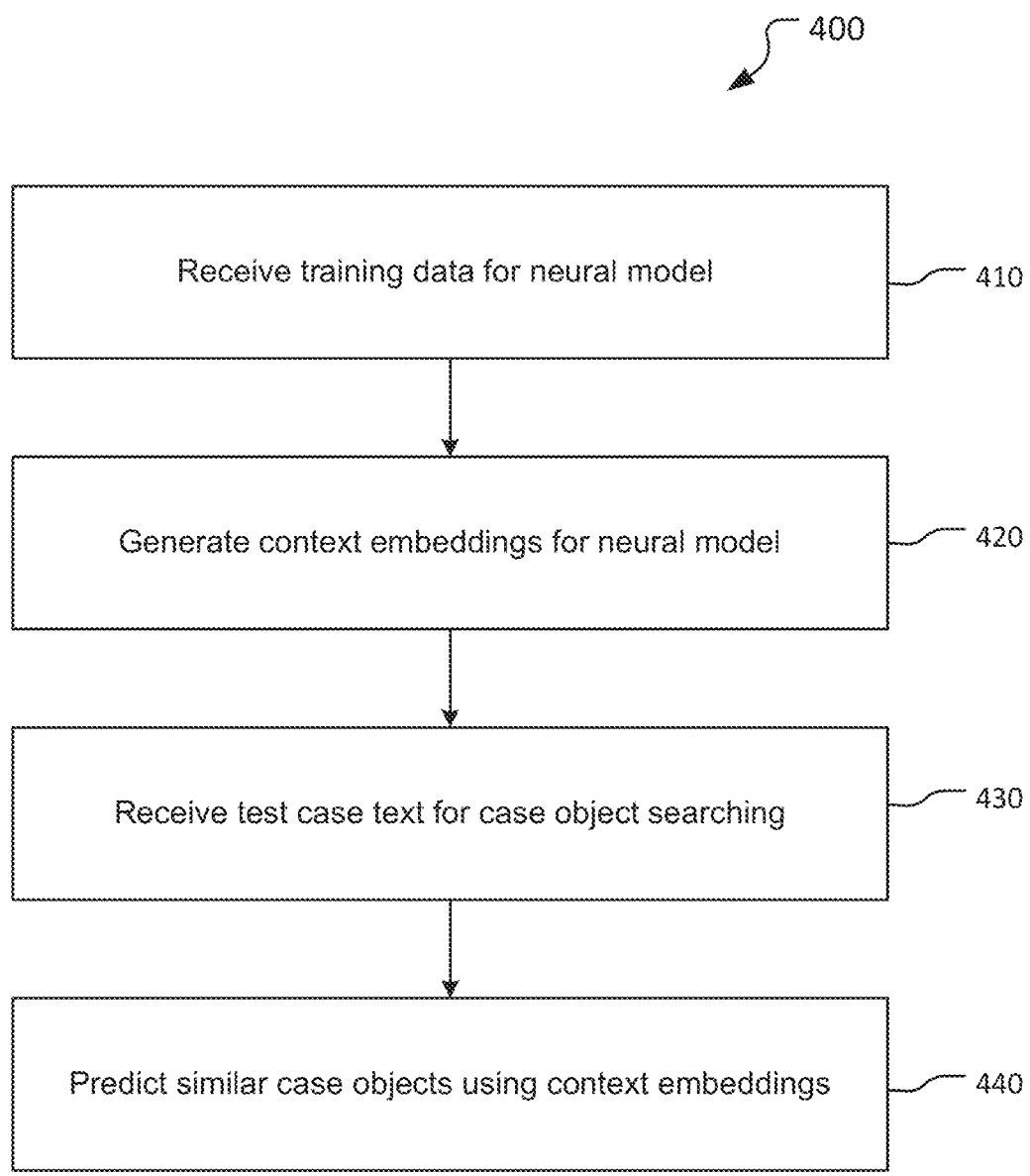
FIG. 4 is a simplified diagram of a method for training and use of a neural network for predicting related cases based on context embeddings according to some embodiments.
Figure 5:
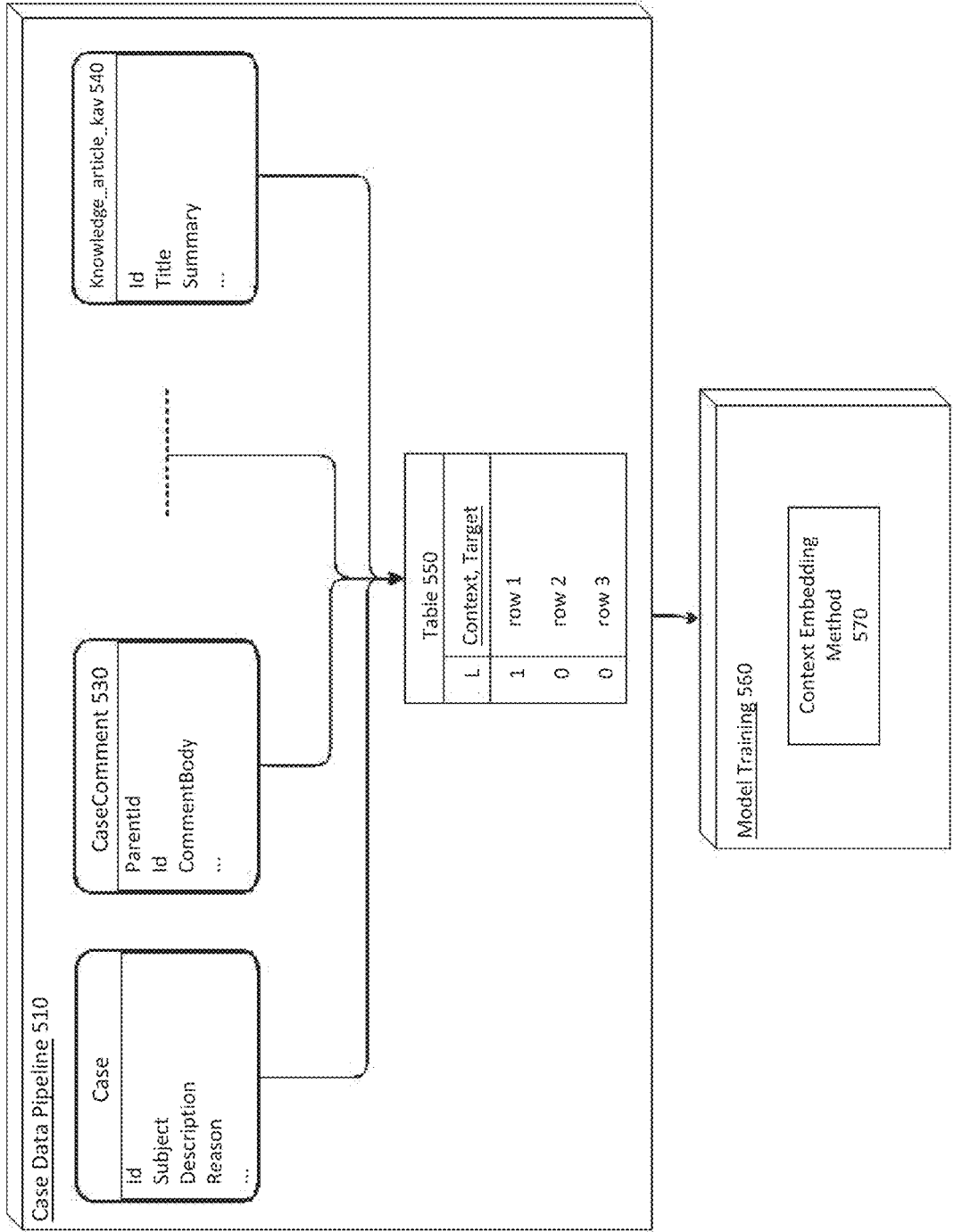
FIG. 5 is a simplified diagram illustrating the training of a neural network for predicting related cases based on context embeddings according to some embodiments.
Figure 6:
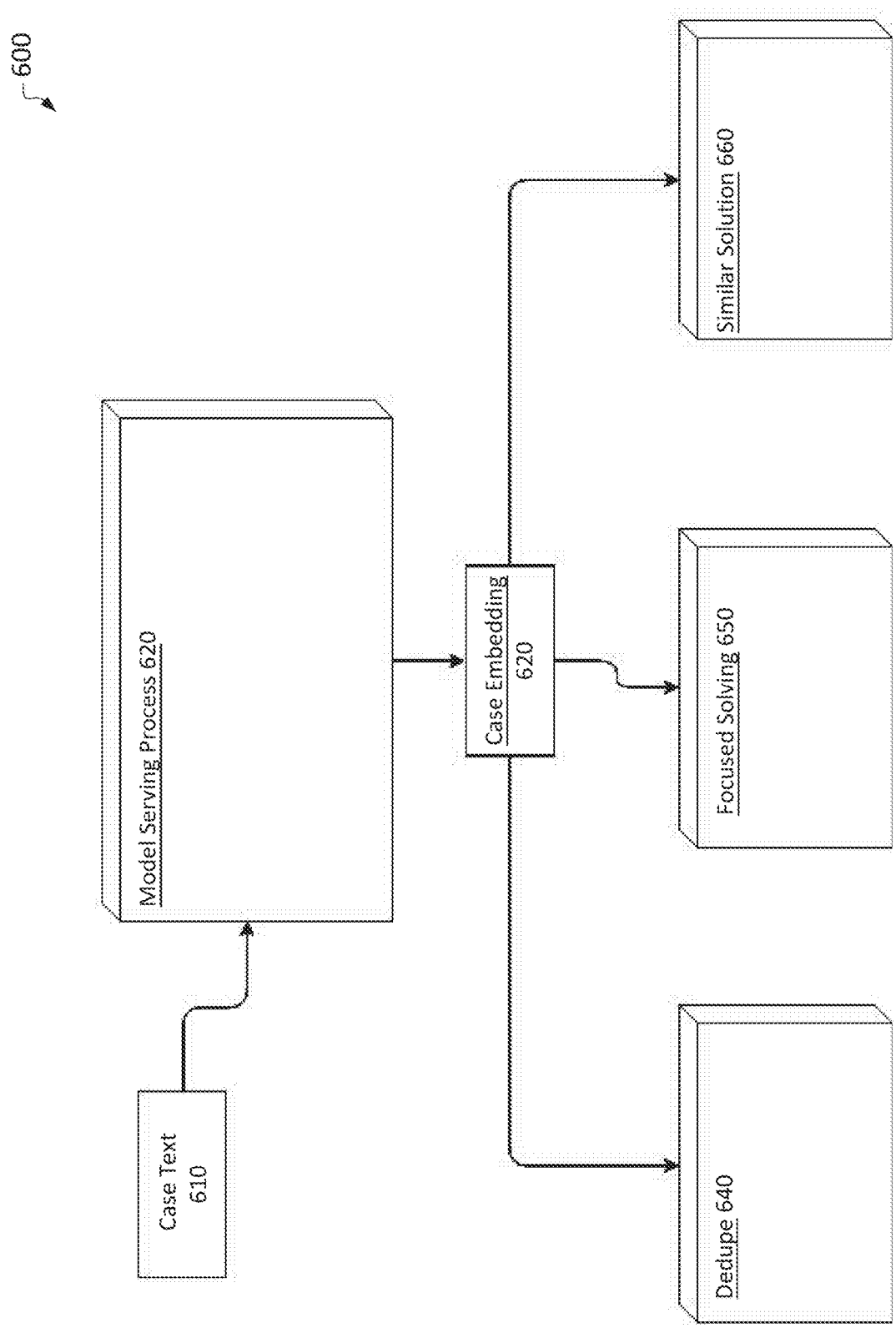
FIG. 6 is a simplified diagram illustrating the use of a trained neural network for predicting related cases based on context embeddings according to some embodiments.
Figure 8:
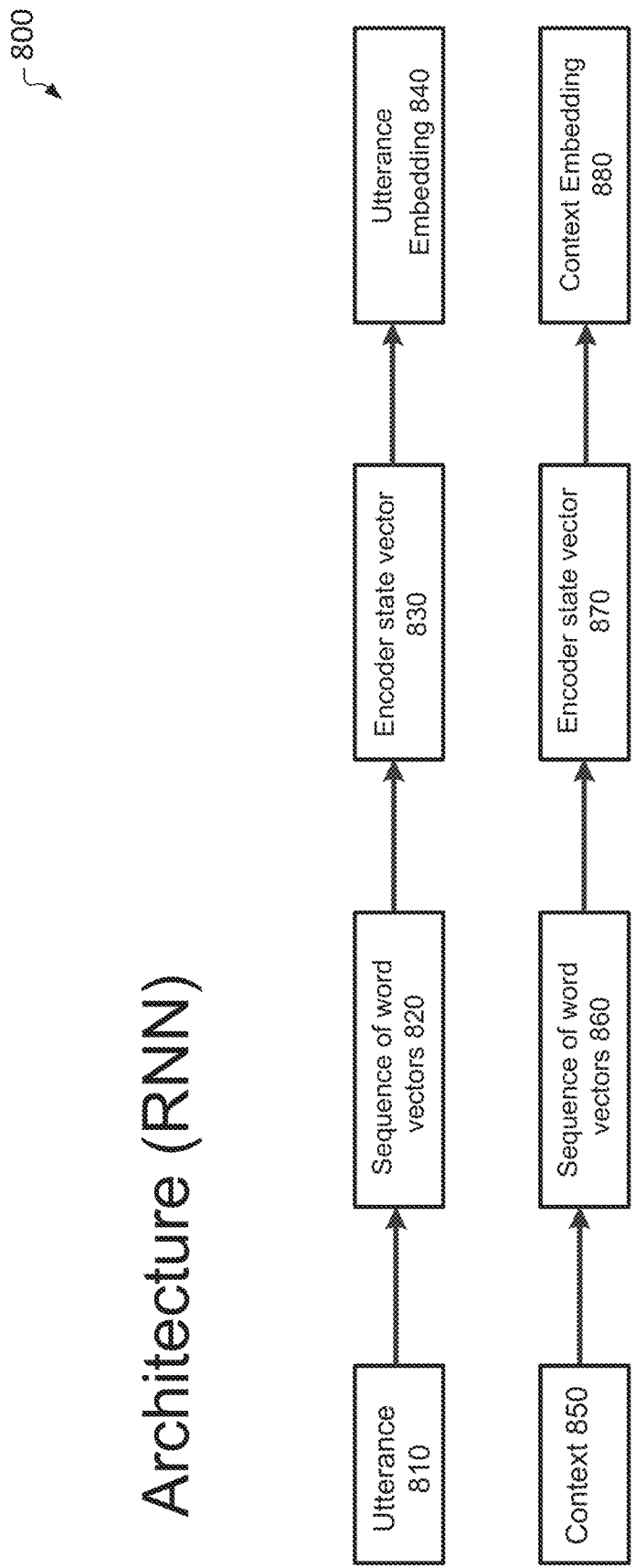
FIG. 8 is a simplified diagram illustrating neural network architecture for generation of a context embedding using the context data input described in FIG. 7 according to some embodiments.

FIG. 4 is a simplified diagram of a method for training and use of a neural network for predicting related cases based on context embeddings according to some embodiments. In some embodiments, neural network 330 can be an implementation of the neural network 330 of computing device 300. FIG. 5 is a simplified diagram illustrating the training of a neural network for predicting related cases based on context embeddings according to some embodiments. FIG. 6 is a simplified diagram illustrating the use of a trained neural network for predicting related cases based on context embeddings according to some embodiments. FIG. 7 is a simplified diagram illustrating an exemplary context data input for determining a context embedding according to some embodiments. And FIG. 8 is a simplified diagram illustrating neural network architecture for generation of a context embedding using the context data input described in FIG. 7 according to some embodiments.

One or more of the processes 410-440 of method 400 may be implemented, at least in part, in the form of executable code stored on non-transitory, tangible, machine-readable media that when run by one or more processors may cause the one or more processors to perform one or more of the processes 410-440. In some embodiments, method 400 can be performed by one or more computing devices in environment 110 of FIGS. 1 and 2.

The model of neural network 330 uses a deep learning to predict similar case objects in a database system (e.g. CRM system 116) based on embedding of contextual objects related to, pointing to, or associated with the case objects. In some embodiments, these include the case objects and those related contextual objects that may be standard for the database system (e.g., case, case thread or comments, agent(s) handling the case, articles for the case, etc.) and provided for customers of the CRM system.

To accomplish this, and with reference to FIGS. 4, 5, 6, 7, and 8, the method 400 starts with a process 410. At process 410, the neural network 330 receives training data for training the neural model so that it is able to predict the case objects that are most relevant for a given query of a case. This training data can include text, utterances, comments, etc. relating to one or more prior case objects (e.g., an utterance, such as a user statement in a CRM system) and contextual objects related to the case objects (e.g., case statement, comments, articles, handling agents, etc. associated with a case object). In some embodiments, the training data can be developed from a raw input dataset obtained from the contextual objects in the database, which may be over a specific period of time, and processed into a dataset (e.g., in table form) for training the neural network 330. Examples of this are illustrated in FIGS. 5 and 7.

At a process 420, the neural network model is trained on the training data. In some embodiments, for training, the neural network may perform pre-processing on the training data, for example, for each word, portion of a word, or character in the a training text sequence or utterance. The embeddings are encoded, for example, with one or more encoding layers of the neural network to generate respective vectors.

The context encoding occurring at process 410 relates to one or more case objects (e.g., "how to create a new account?"; "What is the default and maximum connection timeout for the login( ) API method in the Enterprise Connection?") previously made by customers using the CRM system and stored the database. A case data pipeline 510 of training flowchart 500 includes textual input sequences, such as a case object generated from a user statement (e.g., an utterance 810) that may be entered by a user or a customer of a database system as described herein, which includes contextual objects (e.g., context 850) associated with the case object. At least a portion of the input sequence can relate to a case object's contextual items that point to the case object, such as data contained in a case 520, a case comment 530, a knowledge_article_kav 540, etc.

Exemplary training data is shown in FIGS. 5 and 7. In case data pipeline 510, case 520 is shown with relevant contextual data such as an ID, a subject, a description, and a reason, although additional contextual data may be included in the case data. Case comment 530 may be comments related to case 520 and/or other cases, and includes a parent ID for the parent case, an ID, and comment body. Knowledge_article_kav 540 may correspond to an article linked to case 520 and/or other cases, and may include an ID, title, and summary. In order to create training data having context 850 for a particular user statement (e.g., utterance 810), a table 550 may be constructed using negative sampling with for a case object using the contextual items within a CRM system.

Table 700 in FIG. 7 includes training data 710 displaying exemplary text data included within table 550 before creation of a context embedding. Training data 710 includes raw text data utilized to train neural network 330. In FIG. 7, case text 720, such as a user statement, is taken, and negative sampling is performed to select contextual objects, such as those listed in case comment 730. A label 740 is provided that determines whether each of case comment 730 was actually part of the contextual items related to case text 720. Case text 720 is shown as "What is the default and maximum connection timeout for the login( ) API method in the Enterprise Connection?" Case text 720 is the initial user statement for a case object that generates the case object and causes contextual items to be associated with the case object. As shown in training data 710, a first row of case comment 730 includes a label of 1 and is therefore associated with the case text 720. With negative sampling additional rows of case comment 730 include a label of 0 and are randomly chosen that are not associated with case text 720. Thus, with 20% probability, a comment from the same case may be randomly chosen, and with 80% probability, a comment from a different case may be randomly chosen, and the chosen comments then labeled. The labeling may be done automatically by neural network 330 when sampling data, or may be done by an administrator or user of the system that performs labeling of the randomly selected context objects. The resulting table 550 then corresponds to the text input used to train neural network 330, such as context 850 shown in architecture 800 of neural network 330.

In some examples, the input text for utterance 810 and/or context 850 may correspond to natural language text within training data 710 of FIG. 7. Context 850 may be processed similar to utterance 810 using the training data 710 instead of just the single statement or phrase that corresponds to utterance 810. As shown in FIG. 7, training data 710 illustrates an example of the kind of text input sequences that may then be associated with contextual items, such as the text data within the cells of case comment 730 as an associated contextual item for case text 720. For ease of discussion, case text 720 and case comment 730 is described with respect to each sentence in training data 710, which are shown in the cells of training data 710. However, it is understood that different formats and/or groupings are possible. Further, without loss of generality, the processing of training data 710 is described with respect to each sentence; however other groupings such as phrases, paragraphs, utterances, and/or the like may also be used.

Those statements in case comment 730 correspond to contextual items identified for a case object corresponding to case text 720. Thus, each textual input sequence for utterance 810 and/or context 850 comprises a sequence of words when input into architecture 800 for neural network 330. A pre-processing layer generates an embedding for each word in the text input sequence. Each embedding can be a vector. In some embodiments, these can be word embeddings, such as obtained, for example, by running methods like word2vec, FastText, or GloVe, each of which defines a way of learning word vectors with useful properties. In some embodiments, pre-trained vectors of a certain dimensionality may be used. In some embodiments, the embedding may include partial word embeddings related to portions of a word. For example, the word "where" includes portions "wh," "whe," "her," "ere," and "re." Partial word embeddings can help to enrich word vectors with subword information/FastText. When the pre-processing layer is used on utterance 810, a sequence of word vectors 820 may be generated. Similarly, when applying the pre-processing layer to context 850 (e.g, a paragraph of words corresponding to a contextual item for a case), a sequence of word vectors 860 may be generated based on the sequences of words within the contextual item.

Referring again to FIGS. 7 and 8, as shown, in some embodiments, the pre-processing layer generates one or more sequences of word vectors 820 and 860, each of which relates to a corresponding word in the contextual object's text input sequence. Thus, for case text 720 shown in FIG. 7, a pre-processing layer would generate an embedding for each of the words "What," "is," "the," "default," "and," "maximum . . . " and so forth." Similarly, for the first cell in case comment 730, the pre-processing layer would generate an embedding for the words "Regarding," "your," "questions . . . " and so forth. In some instances, a text input sequence, e.g., used for training, may comprise few words, in which case, the embeddings output from the pre-processing layer can be "padded," e.g., with zeros. A mask layer masks such numbers so that they are ignored or not processed in subsequent layers, for example, to help reduce training time.

Utilizing sequence of word vectors 820 and/or sequence of word vectors 860, an encoding layer may form or make up an encoder stack, which receives the embeddings from the pre-processing layer and generates encodings based on the same. The encoding layers learn high-level features from the words of textual input sequence. Each encoding layer generates encodings (e.g., vectors) which map the words in the text input sequence to a higher dimensional space. The encodings can encode the semantic relationship between words. In some embodiments, the encoding layers or encoder stack is implemented with a recurrent neural network (RNN). RNNs are deep learning models that process vector sequences of variable length. This makes RNNs suitable for processing sequences of word vectors 820 and 860. In some embodiments, the encoding layers can be implemented with one or more gated recurrent units (GRUs). A GRU is a specific model of recurrent neural network (RNN) that intends to use connections through a sequence of nodes to perform machine learning of tasks. GRUs help to adjust the neural network input weights to solve the vanishing gradient problem that is common issue with RNNs. The weights applied to utterances 810 and context 850 may be separate and different. In some embodiments, encoding layers can be implemented with one or more long-term short-term memory (LSTM) encoders.

A plurality of the GRUs may be arranged in rows. A first row of the GRUs looks at or operates on information (e.g., embeddings or encodings) for respective words in the text input sequence in a first (e.g., "forward") direction, with each GRU generating a corresponding state vector and passing that vector along to the next GRU in the row (e.g., as indicated by the arrows pointing from left to right). For example, with respect to the example of text sequence shown in FIG. 7, the first row of GRUs would operate on the embeddings for each of the words in the order of "What," "is," "the," "default," "and," "maximum . . . " and so forth. A second row of GRUs looks at or operates on information (e.g., embeddings or encodings) for respective words in the input sequence in a second (e.g., "backward") direction, with each GRU generating a corresponding hidden state vector and passing that vector along to the next GRU in the row. The resulting state vectors from sequence of word vectors 820 and sequence of word vectors 860 correspond to encoder state vector 830 and encoder state vector 870, respectively.

The neural network 330 converts encoder state vectors 830 and 870 using an embedding layer. The embedding layer comprises an embedding matrix of vectors generated or based on the encoder state vectors 830 and 870. An embedding layer can comprise an embedding matrix of a particular size (e.g., depending of the dimensionality of the previously obtained vectors), which pulls the corresponding vectors from the matrix based on the indexes in the input array of the encoder state vectors 830 and 870. Thus, encoder state vector 830 may be embedded to generate an utterance embedding 840. Similarly, encoder state vector 870 may be embedded to generate a context embedding 880. The weights (values) of the embedding matrix are initialized at random and/or separately and updated/learned using back-propagation at training time.

Context embedding 880 may be used for model training 560 in training flowchart 500, which may be trained using context embedding method 570 described above to generate context embedding 880 (as well as utterance embedding 840). According to some embodiments, utterance embedding 840 and context embedding 880 may be learned end-to-end while training the neural network 330 (with other features) on its classification task. The training will result in having one vector per context 850 and cluster the contexts based on their context characteristics. For instance, two contexts having similar context embeddings will end up having similar vectors, closer than distant context embeddings. The utterance embedding 840 and/or context embedding 880 are then flattened at a respective flattener and/or concatenated at a respective concatenator.

The model of neural network 330 is trained using the concatenated features or vectors. For training, neural network 330 may include or be implemented with a multi-layer or deep neural network or neural model, having one or more layers. According to some embodiments, examples of multi-layer neural networks include the ResNet-32, DenseNet, PyramidNet, SENet, AWD-LSTM, AWD-QRNN and/or the like neural networks. The ResNet-32 neural network is described in further detail in He, et al., "Deep Residual Learning for Image Recognition," arXiv: 1512.03385, submitted on Dec. 10, 2015; the DenseNet neural network is described in further detail in Iandola, et al., "Densenet: Implementing Efficient Convnet Descriptor Pyramids," arXiv: 1404.1869, submitted Apr. 7, 2014, the PyramidNet neural network is described in further detail in Han, et al., "Deep Pyramidal Residual Networks," arXiv: 1610.02915, submitted Oct. 10, 2016; the SENet neural network is described in further detail in Hu, et al., "Squeeze-and-Excitation Networks," arXiv: 1709.01507, Sep. 5, 2017; the AWD-LSTM neural network is described in further detail in Bradbury, et al., "Quasi-Recurrent Neural Networks," arXiv: 1611.01576, submitted on Nov. 5, 2016; each of which are incorporated by reference herein.

Each neural network layer can operate or process the features or vectors, performing, for example, regularization (e.g., L2 and L1 regularization, Early stopping, etc.), normalization, and activation. In some embodiments, each neural network layer may include a dense layer, batch normalization, and a dropout for deep learning. In some embodiments, a respective rectifier linear unit (ReLU) at the end of each layer performs a ReLU activation function. An output layer of the neural network 330 performs a softmax function to produce or generate one single model for all contexts. The global model predicts case objects for present queries or a test case object into a database system, such as system 116. In some embodiments, the model comprises or represents a probability distribution for each case object (whether standard or custom) with respect to a given search or test case object based on the case object's context. For the distribution, each case object has a corresponding numerical value representing or indicative of the relevance of that such case object to the present search case object. In some embodiments, the softmax layer can be implemented with a high-rank language model, called Mixture of Softmaxes (MoS), to alleviate softmax bottleneck issues.

Once model training 560 is performed using context embedding method 570, a model serving flowchart 600 in FIG. 6 may utilize trained neural network 330 for various use cases. For example, after training, the global model of neural network 330 is used for prediction of case objects responsive to a query having a test case object presently made by any user of the database system, such as system 116. In some embodiments, at query time, the model is loaded as a tensorflow model in java. At a process 430, the neural network 330 may receive a user query, such a case text 350 described with computing device 300 in FIG. 3 and/or case text 610 described with model serving flowchart 600 in FIG. 6, for case object searching. For example, in FIG. 6, case text 610 may be provided to model serving process 620 for neural network 330. In some embodiments, case text 610 could be input by a user in a search bar or similar user interface tool on a respective user system 112 (see FIG. 1), which could be a handheld computing device, a mobile phone, a laptop computer, a notepad computer, a work station, and/or a network of computing devices. The user query could, for example, be one that includes the case text 610, such as "What is the default and maximum connection timeout for the login( ) API method in the Enterprise Connection?" and within the database, one or more words of case text 610 could appear in some number of case objects. In some embodiments, case text 610 may be converted to a case embedding 630 for use when searching, such as utterance embedding 840. This may allow for identification of similar case objects through clustering of embeddings in vector space.

At a process 440, neural network 330 responds to the case text 610 using model serving process 620 and case embedding 630 determined by neural network 330 for case text 610. Case embedding 630 may result from the query of case text 610 into the database system by embedding case text 610 in a similar manner as described above to generate an utterance embedding 840 and context embedding 880. For example, case embedding 630 may correspond to an embedded case that allows for vector clustering and identification of similar case embeddings and thus case objects and contextual objects for case objects related to case embedding 630 (such as a case object, case comments, a knowledge article, etc.) the user intends to search. In some examples, case embedding 630 may correspond to a case embedding of a case, such as utterance embedding 840, or may correspond to a context embedding, such as context embedding 880. Thus, case embedding 630 may correspond to an embedding of an input case and/or an input context associated with the case. In some examples, when determining similar cases, input of search data of either or both of a case embedding (e.g., utterance 810) or a context embedding (e.g., context 850) may therefore be utilized to determine similar contexts and context embeddings within neural network 330.

The neural network 330 outputs results based on the prediction. Continuing with the example given above, the database system can output one or more similar case objects that include context embeddings associated with case embedding 630 resulting from "What is the default and maximum connection timeout for the login( ) API method in the Enterprise Connection?," based upon, among other things, case text 610 (characters and words) embedded into case embedding 630. In some examples, case embedding 630 may correspond to a context embedding such that the context embeddings resulting from case embedding 630 may be matched or clustered to similar contexts and context embeddings. For example, input data similar to context 850 may be encoded and embedded, and may be utilized as case embedding 630 input to neural network 330. Thus, case embedding 630 may correspond to an embedding of utterance 810 and/or context 850 that may be utilized to more intelligently search a database system. This provides a better and more optimal user experience for the search function into the database. Some of the additional use cases after predicting related case objects to case text 610 are described further below.

For example, a dedupe process 640 may be performed based on the results determined at process 440. A dedupe or "deduplication" process may refer to a process to eliminate or reduce duplicate or similar case objects in a CRM system. For example, a customer may provide multiple help queries when requesting help from an agent in a CRM system, or similar or the same case object by different customers when submitting help requests. Thus, the CRM system and neural network 330 may include multiple duplicate case objects, which may impede performance and reduce available memory for the CRM system. As such, dedupe process 640 may be performed based on the results obtained at process 440, where a clustering algorithm/process for case embedding 630 and the system's context embeddings corresponding to context embedding 880 generated for the system's case objects.

In certain embodiments, a nearest neighbor search may be conducted based on the vectors for case embedding 630 and the system's context embeddings corresponding to context embedding 880 generated for the system's case objects. In other embodiments, locality-sensitive hashing (LSH) may be used to reduce the dimensionality of high dimensional case embedding 630 and the context embeddings and thereby map similar case objects to case text 610. This results in clustering one or more case objects with each other, which provides the predicted case objects as a result. Using a binary classification with the results and case text 610/case embedding 630, the dedupe process may remove duplicate entries. For example, a binary classification of 1 may recognize the case objects and the same, while 0 may recognize them as separate (although potentially related due to the similar vectors). One or more case objects may therefore be identified for case text 610 for removal by dedupe process 640 and may be culled from the system so that duplicate case objects do not impede system performance.

In further embodiments, a focused solving process 650 may be used for agent assistance in a CRM system. Once case embedding 630 is generated for case text 610, neural network 330 may return results that are used for focused solving process 650. The results may similarly be returned using a clustering algorithm (e.g., nearest neighbor algorithms, or utilizing LSH to reduce vector dimensionality and identify buckets of similar context embeddings for case embedding 630). The results may be provided through an output interface that identifies the similar case objects to case text 610, and therefore allows an agent to view the similar cases. This may allow the agent to perform "focused solving" within the area of the cases, for example, to learn more about the particular grouping of case objects for training and/or focus solving on a particular issue associated with the case objects.

A similar solution process 660 may also be provided for agent problem solving of a particular new case object, such as an utterance provided by a customer for case text 610 (embedded as case embedding 630). As previously discussed, a clustering algorithm or LSH may be used to identify similar case objects to case text 610. After returning the similar case objects to case embedding 630 from the system's context embeddings generated similar to context embedding 880, a majority/consensus voting process may be utilized to select a particular solution, case comment, article, agent, and/or similar contextual object for the returned case objects. The voting process may identify a most common or most shared solution between the related case objects or other contextual item, and may therefore provide a "similar solution" from the returned case objects for use with case text 610. This may allow an agent to provide a similar solution (or other contextual object) from the returned case objects to respond to a customer's request for case text 610.

As discussed above and further emphasized here, FIGS. 4, 5, 6, and 8 are merely examples of a neural network 330 and corresponding method 400 for training and use which should not unduly limit the scope of the claims. One of ordinary skill in the art would recognize many variations, alternatives, and modifications.

Some examples of computing devices, such as computing device 300, may include non-transitory, tangible, machine readable media that include executable code that when run by one or more processors (e.g., processor 310) may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A system for a machine learning engine using clustered case objects in a case management system, the system comprising:
   a multi-layer neural network;
   wherein the system is configured to:
      receive case object data comprising a case object and contextual objects in the case management system associated with the case object, the contextual objects comprising first word vectors;
      determine a parent identifier (ID) for the case object, the parent ID being associated with a parent case having related case objects to the case object;
      determine comments for the related case objects associated with the case object based on the parent ID and the comments comprising second word vectors wherein the first word vectors and the second word vectors each comprise n-dimensional vectors associated with a machine learning model for the case management system;
      generate, for the machine learning model, a context embedding for the case object using the first word vectors for the contextual objects and second word vectors for the contextual objects; and
      cluster the case object with other case objects in the case management system based on the context embedding for the case object and other context embeddings for the other case objects.

2. The system of claim 1, wherein the case management system comprises a customer relationship management system, and wherein the case object comprises a help thread within the customer relationship management system.

3. The system of claim 1, wherein the contextual objects comprise at least one of a case subject, case description, case identifier, case status, case comments, case status updates, case articles, or agents that handled the case object.

4. The system of claim 1, wherein the system is configured to cluster the case object with the other case objects by creating the machine learning model for case searching based on the context embedding and the other context embeddings.

5. The system of claim 4, wherein the system is further configured to:
receive case text for a target case requested for the case searching using the machine learning model, wherein the case text comprises case text word vectors;
generate an utterance embedding using the case text word vectors; and
determine related cases in the case management system using the machine learning model and locality-sensitive hashing.

6. The system of claim 5, wherein the system is further configured to:
perform deduplication on the target case and the related cases based on binary classification of the related cases.

7. The system of claim 6, wherein the system is further configured to:
identify the related cases for focused solving of an issue associated with the target case.

8. The system of claim 6, wherein the system is further configured to:
identify the related cases for a potential solution to an issue associated with the target case based on consensus voting of the related cases.

9. A method for predicting entities for a machine learning engine using clustered case objects in a case management system, the method comprising:
receiving case object data comprising a case object and contextual objects in the case management system associated with the case object, the contextual objects comprising word vectors;
determining a parent identifier (ID) for the case object, the parent ID being associated with a parent case having related case objects to the case object;
determining comments for the related case objects associated with the case object based on the parent ID and the comments comprising second word vectors wherein the first word vectors and the second word vectors each comprise n-dimensional vectors associated with a machine learning model for the case management system;
generating, for the machine learning model, a context embedding for the case object using the first word vectors for the contextual objects and second word vectors for the contextual objects; and
clustering the case object with other case objects in the case management system based on the context embedding for the case object and other context embeddings for the other case objects.

10. The method of claim 9, wherein the case management system comprises a customer relationship management system, and wherein the case object comprises a help thread within the customer relationship management system.

11. The method of claim 9, wherein the contextual objects comprise at least one of a case subject, case description, case identifier, case status, case comments, case status updates, case articles, or agents handled for the case object.

12. The method of claim 9, wherein the clustering the case object with the other case objects comprises creating the machine learning model for case searching based on the context embedding and the other context embeddings.

13. The method of claim 12, further comprising:
receiving case text for a target case requested for the case searching using the machine learning model, wherein the case text comprises case text word vectors;
generating an utterance embedding using the case text word vectors; and
determining related cases in the case management system using the machine learning model and locality-sensitive hashing.

14. The method of claim 13, further comprising:
performing deduplication on the target case and the related cases based on binary classification of the related cases.

15. The method of claim 13, further comprising:
identifying the related cases for focused solving of an issue associated with the target case.

16. The method of claim 13, further comprising:
identifying the related cases for a potential solution to an issue associated with the target case based on consensus voting of the related cases.

17. A non-transitory machine readable medium having stored thereon instructions for performing a method comprising machine executable code which when executed by at least one machine, causes the machine to:
receive case object data comprising a case object and contextual objects in a case management system associated with the case object, the contextual objects comprising word vectors;
determine a parent identifier (ID) for the case object, the parent ID being associated with a parent case having related case objects to the case object;
determine comments for the related case objects associated with the case object based on the parent ID and the comments comprising second word vectors wherein the first word vectors and the second word vectors each comprise n-dimensional vectors associated with a machine learning model for the case management system;
generate, for the machine learning model, a context embedding for the case object using the first word vectors for the contextual objects and second word vectors for the contextual objects; and
cluster the case object with other case objects in the case management system based on the context embedding for the case object and other context embeddings for the other case objects.

18. The non-transitory machine readable medium of claim 17, wherein the case management system comprises a customer relationship management system, and wherein the case object comprises a help thread within the customer relationship management system.

19. The non-transitory machine readable medium of claim 17, wherein the contextual objects comprise at least one of a case subject, case description, case identifier, case status, case comments, case status updates, case articles, or agents handled for the case object.

20. The non-transitory machine readable medium of claim 17, wherein the machine is caused to cluster the case object with the other case objects by creating the machine learning model for case searching based on the context embedding and the other context embeddings.

21. The non-transitory machine readable medium of claim 20, storing instructions which when executed by at least one machine, further causes the machine to:
receive case text for a target case requested for the case searching using the machine learning model, wherein the case text comprises case text word vectors;

generate an utterance embedding using the case text word vectors; and determine related cases in the case management system using the machine learning model and locality-sensitive hashing.

22. The non-transitory machine readable medium of claim 21, storing instructions which when executed by at least one machine, further causes the machine to:

perform deduplication on the target case and the related cases based on binary classification of the related cases.

23. The non-transitory machine readable medium of claim 21, storing instructions which when executed by at least one machine, further causes the machine to:

identify the related cases for focused solving of an issue associated with the target case.

24. The non-transitory machine readable medium of claim 21, storing instructions which when executed by at least one machine, further causes the machine to:

identify the related cases for a potential solution to an issue associated with the target case based on consensus voting of the related cases.

\* \* \* \* \*